United States Patent
Peterson

(10) Patent No.: US 8,141,001 B2
(45) Date of Patent: Mar. 20, 2012

(54) SYSTEM, METHOD AND COMPUTER-READABLE MEDIUM FOR DIRECTING A COMPUTATIONAL SYSTEM TO DEFRAGMENT AND MAINTAIN A DISC MEMORY

(76) Inventor: Harold Lee Peterson, Scotts Valley, CA (US)

( * ) Notice: Subject to any disclaimer, the term of this patent is extended or adjusted under 35 U.S.C. 154(b) by 801 days.

(21) Appl. No.: 12/217,909

(22) Filed: Jul. 9, 2008

(65) Prior Publication Data
US 2010/0011323 A1 Jan. 14, 2010

(51) Int. Cl.
*G06F 3/048* (2006.01)
*G06F 12/00* (2006.01)

(52) U.S. Cl. ........ 715/847; 715/835; 707/805; 711/170; 711/100

(58) Field of Classification Search .......... 715/835, 715/847, 764; 707/781, 802, 805; 711/100, 711/112, 170, 173
See application file for complete search history.

(56) References Cited

U.S. PATENT DOCUMENTS

| | | | |
|---|---|---|---|
| 5,960,411 A | 9/1999 | Hartman et al. | |
| 6,496,913 B1 | 12/2002 | Taugher et al. | |
| 6,523,035 B1 * | 2/2003 | Fleming et al. | 707/770 |
| 6,735,678 B2 | 5/2004 | Noble et al. | |
| 7,120,832 B2 | 10/2006 | Collins et al. | |
| 7,149,822 B2 | 12/2006 | Edanami | |
| 7,155,592 B2 | 12/2006 | Andoh et al. | |
| 7,289,291 B1 | 10/2007 | Schlumberger | |
| 2004/0148476 A1 * | 7/2004 | Altare | 711/159 |
| 2007/0028231 A1 * | 2/2007 | Kelso et al. | 717/174 |
| 2008/0034182 A1 * | 2/2008 | Takemura | 711/173 |

OTHER PUBLICATIONS

Webpage, http://www.abexo.com/defrag.htm, Downloaded on Jul. 8, 2008.

* cited by examiner

*Primary Examiner* — Xiomar L Bautista
(74) *Attorney, Agent, or Firm* — Patrick Reilly

(57) ABSTRACT

A method, system and computer-readable media for enabling a user of a computer to initiate a defragmentation process of a hard disc of a hard disc drive are provided. One version of the method includes (a.) presenting an icon identifying a defragmentation process, the presentation comprised within a desktop startup display of a computer; and (b.) in response to only a single action performed by a user, directing the computer to execute the defragmentation process. The single action may be a depression of, i.e., a clicking, a button of a computer mouse, a pointing device, or a television remote control, or of a key on a key pad of a computer. The computer may be a personal computer, a wireless telephone, a computer game console, a digital television, or a personal digital assistant.

19 Claims, 12 Drawing Sheets

SYSTEM, METHOD AND COMPUTER-READABLE MEDIUM FOR DIRECTING A COMPUTATIONAL SYSTEM TO DEFRAGMENT AND MAINTAIN A DISC MEMORY

FIELD OF THE INVENTION

The present invention relates to information technology systems that include a memory module that stores information on a hard disc. The present invention more particularly relates to reducing the amount of fragmentation in one or more software encoded file systems as stored on a memory disc of a hard disc drive of an information technology system.

BACKGROUND OF THE INVENTION

Consumers are often aware that routine maintenance operations should be performed on personal computers and other information technology systems in a systematic way or at regular intervals. Yet it is not uncommon for a user or purchaser of an electronic computational device to lack the specific knowledge of how to direct the electronic device to perform such preventative maintenance operations. In particular, it is widely known that memory discs of hard disc drives of personal computers should routinely be defragmented, but many consumers remain unfamiliar with how to run defragmentation utility programs that are typically resident on their personal computer or other electronic computational device when purchased.

In the context of maintaining and administering information technology systems, defragmentation is a process that reduces the amount of fragmentation exhibited by software encoded file systems as stored in a physical computer-readable medium, such as a magnetic or an optical disc. Many information technology systems defragment a memory disc by physically reorganizing the contents of the disc to store the pieces of each software-encoded file close together and contiguously. Certain information technology systems further attempt to create larger regions of free space within a hard disc by using compaction to impede the return of fragmentation.

Hundreds or thousands of software-encoded files may be written into and stored in a hard disc of a personal computer or other computational device. As software files are eliminated in the disc and new ones are added during operations of the host device, fragmentation of the disc space may be affected wherein numerous areas of the disc that are temporarily not tasked with storing accessible information may separate disc space that is storing accessible information. The efficiency of searching for information stored on a hard disc can be degraded by the presence of large and/or numerous areas of temporarily unused disc space when the unused disc space areas are widely interspersed with disc space areas that store information that is designated by a comprising or communicatively coupled information technology system to be presently accessible. Effective and timely defragmentations of a hard disc will thus typically support the more efficient operation of the hard disc drive and may save a computer user both time and expense.

There is therefore a long felt need to simplify the actions needed to be taken by a user of a computational device having a hard disc drive to routinely, systematically or occasionally defragment the hard disc of the hard disc drive.

SUMMARY OF THE INVENTION

Towards this object and other objects that will be made obvious in light of this disclosure, a first version of the method of the present invention provides a system for defragmenting a memory disc of a hard disc drive.

The method of the present invention provides a method of defragmenting a disc memory of an electronic computational device. A first preferred embodiment of the method of the present invention includes presenting an icon used to actuate a defragmentation process. The icon may be visually displayed within a desktop startup display of a computational device. The computational device may be configured in response to only a single action performed by a user, directing the computer to execute the defragmentation process. The disc defragmentation process may additionally or alternatively be executed by user selection of a second icon of a system tools folder in certain alternate preferred embodiments of the method of the present invention. The system tools folder may be included within an accessories folder and/or a program folder.

In certain yet alternate preferred embodiments of the method of the present invention, the single action may be a depression of, i.e., a clicking, a button of a computer mouse, a pointing device, or a television remote control, or of a key on a key pad of a computational device, or "computer". The computer may be a personal computer, a wireless telephone, a computer game console, a digital television, or a personal digital assistant.

The single action may alternatively or additionally be performed while a cursor is positioned over a predefined area of the displayed information or a displayed indication presented on a video screen. The displayed indication may be or include an image of text, a logo, a trademark and/or a graphic image.

In certain still alternate preferred embodiments of the method of the present invention, the user may direct a computer to display the defragmentation process icon by selecting a start menu of the computer.

Certain other alternate preferred embodiments of the method of the present invention provide a computer for defragmenting a disc memory of a computer. The computer may include means to visually present an icon useful for actuating a defragmentation process; and (b.) means to direct the computer to initiate the defragmentation process in response to a single action performed by a user.

Certain still other alternate preferred embodiments of the method of the present invention provide a computer-readable media comprising software-encoded instructions that direct an information technology system to practice one or more aspects of the method of the present invention as disclosed herein.

The foregoing and other objects, features and advantages will be apparent from the following description of the preferred embodiment of the invention as illustrated in the accompanying drawings.

Incorporation by Reference

All publications, patents, and patent applications mentioned in this specification are herein incorporated by reference in their entirety and for all purposes to the same extent as if each individual publication, patent, or patent application was specifically and individually indicated to be incorporated by reference. In addition the following United States Patents are hereby incorporated herein by reference in their entirety and for all purposes: U.S. Pat. No. 5,960,411 (Hartman, et al., Sep. 28, 1999) entitled "Method and system for placing a purchase order via a communications network"; U.S. Pat. No. 6,735,678 (Noble, et al., May 11, 2004) entitled "Method and apparatus for disc drive defragmentation"; U.S. Pat. No. 7,120,832 (Collins, et al., Oct. 10, 2006) entitled "Storage device performance monitor"; U.S. Pat. No. 7,149,822 (Edanami, Dec. 12, 2006) entitled "Information storage device having internal defragmentation capability"; U.S. Pat. No. 7,155,592 (Andoh, et al., Dec. 26, 2006) entitled "System and method for onboard HDD defragmentation and combining multiple G-list entries"; U.S. Pat. No. 6,496,913 (Taugher, et al., Dec. 17, 2002) entitled "System and method for detecting and correcting fragmentation on optical storage media"; and U.S. Pat. No. 7,289,291 (Schlumberger, Oct. 30, 2007) entitled "Disk drives and methods allowing for super silent seeks".

BRIEF DESCRIPTION OF THE DRAWINGS

These, and further features of the invention, may be better understood with reference to the accompanying specification and drawings depicting the preferred embodiment, in which.

DETAILED DESCRIPTION OF A PREFERRED EMBODIMENT

In describing the preferred embodiments, certain terminology will be utilized for the sake of clarity. Such terminology is intended to encompass the recited embodiment, as well as all technical equivalents, which operate in a similar manner for a similar purpose to achieve a similar result.

Figure 1:
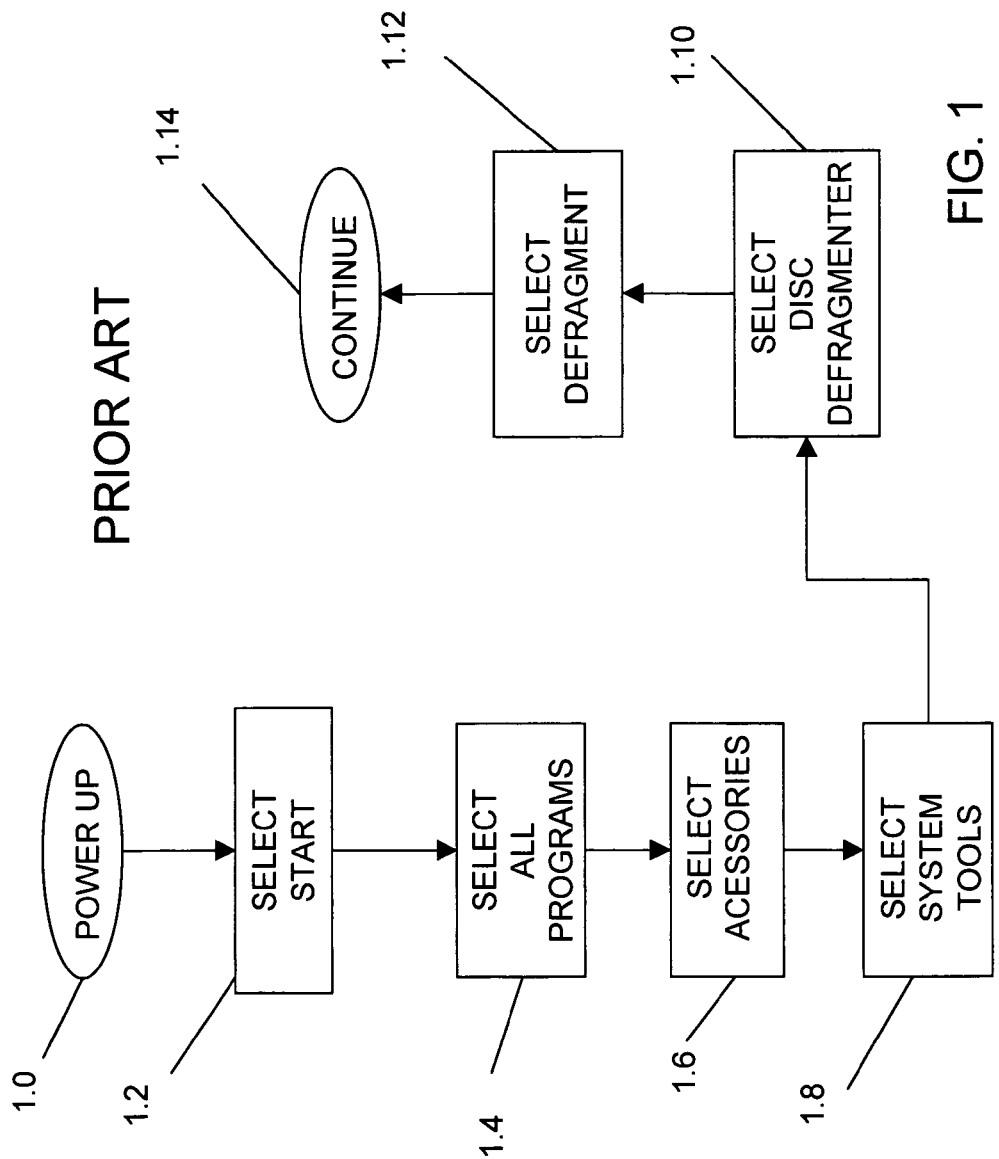
FIG. 1 is a flowchart of a prior art process that enabled a user of certain prior art personal computers to direct the personal computer to run a defragmentation software program.

Referring now to FIG. 1, FIG. 1 is a flowchart of a prior art process that enabled a user of certain prior art personal computers to direct a personal computer to run a defragmentation software program (hereafter, "defragmenter"). In particular, a defragmenter resident on a standard build of a Vaio Model PCG 9J2L™ personal computer as marketed by Sony Corporation of New York City, N.Y. and hosting a licensed copy of Windows XP Professional Version 2002™ personal computer operating system as marketed by Microsoft Corporation of Redmond Wash. is typically configured to enable the process of FIG. 1. It is understood that the user has more than one avenue to direct the direct the Sony Vaio to run the defragmenter, such as by placing a shortcut icon on the virtual desktop as displayed by the Windows™ operating system, or by employing a scripting language to automate the presentation of a defragmenter icon on the virtual desktop. Yet all of these prior art methods require the user to make multiple decisions and actions in order to support a routine and sufficiently frequent execution of the defragmenter. As still another prior art example Abexo Corporation markets a disc defragmenter software that may be purchased and installed on many personal computers, e.g., a Vaio Model PCG 9J2L, but requires the user to make multiple selections in the installation and application process.

FIG. 1 illustrates that a user may work through the software folders of the Vaio Model PCG 9J2L (hereafter, "Vaio") by first powering up the Vaio in step 1.0 and then using a mouse pad of the Vaio to select the START icon as presented on a video screen of the Vaio by means of pointing and clicking operation of a mouse pad of the Vaio. The user may then open an ALL PROGRAMS folder in step 1.4 and then select an ACCESSORIES folder from within the ALL PROGRAMS folder as per step 1.6. The user may then further select a SYSTEMS TOOLS folder from within the ACCESSORIES folder in step 1.8, and from within the ACCESSORIES folder select a DEFRAGMENTER icon in step 1.10 to open up a menu of a defragmenter software program. The user must then, in order to direct the Vaio to execute the defragmenter software program, select a DEFRAG button icon from a defragmenter menu as displayed on the virtual desktop presented by the video screen of the Vaio.

Figure 2:
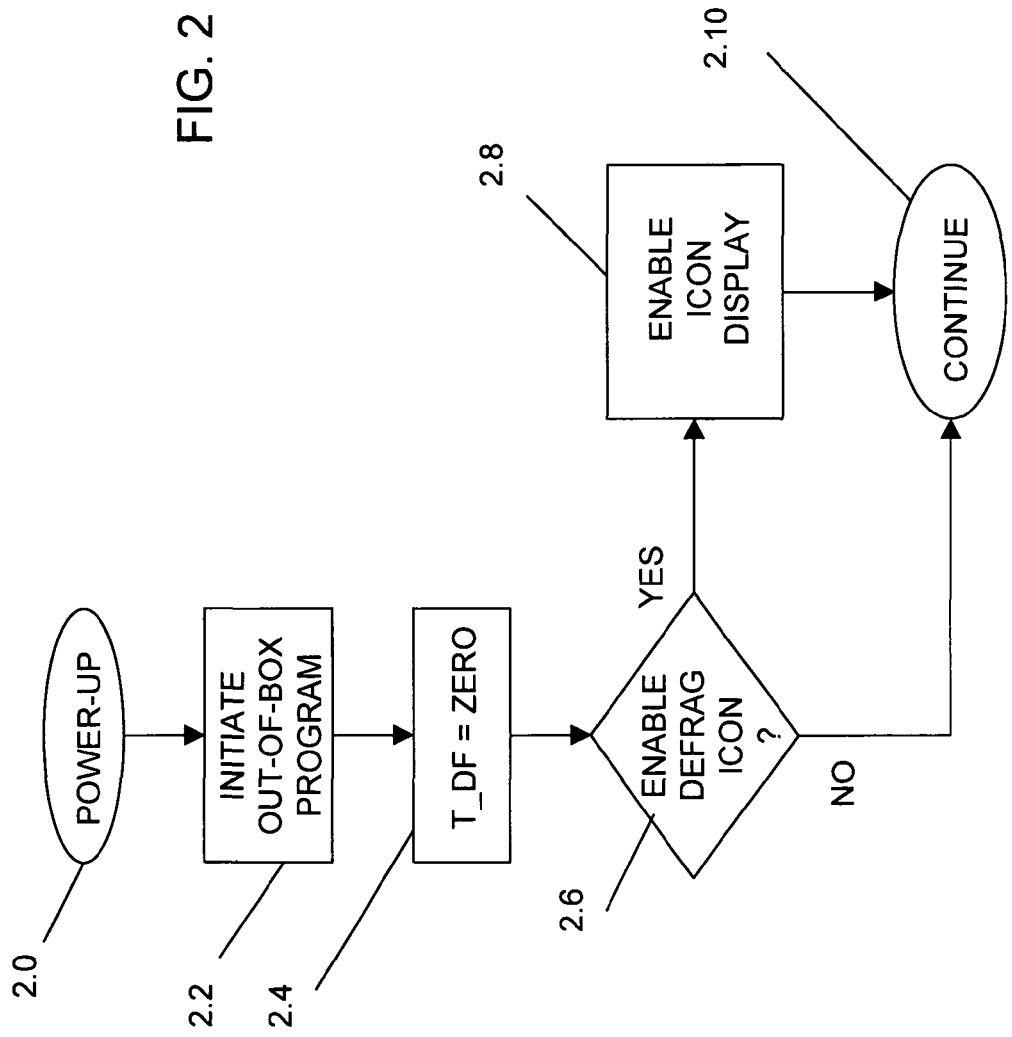
FIG. 2 is in an illustration of a process by which a user may elect to enable presentation of a defrag icon of FIG. 9 that permits the user to direct a hosting computer of FIG. 11 to run a defragmenter on a hard disc of the hosting computer of FIG. 11.

Referring now generally to the Figures and particularly to FIG. 2, FIG. 2 is in an illustration of a process, i.e., a first preferred embodiment of the method of the present invention, by which a user may elect to enable presentation of a defrag icon 2 (as per FIG. 9) that permits the user to direct a hosting computer 4 to run a defragmenter 6 on a hard disc 8 of a hard disc drive 10 the hosting computer 4 (as per FIG. 11) by taking a single action or providing a single command to the hosting computer 4. The single action or single input command may be affected (as per FIGS. 9, 10 and 11) by using a computer mouse 12 of the hosting computer 4 to place a cursor 14 over the defrag icon 2 and clicking a button 16 of the mouse 12. In step 2.0 the user powers up the hosting computer 4 (hereafter, "computer" 4) and directs the computer 4 to initiate an out-of-box set-up procedure according to software instructions stored within the computer 4. In step 2.4 the computer 4 sets a defrag time variable T_DF to a zero value. The defrag time variable T_DF may be used to indicate an elapsed time since a most recent instance of running the defragmenter 6 as initiated by the user. The user is offered the choice of directing the computer 4 to present the defrag icon 2 on a virtual desktop image 18 of a video screen 20 of the computer 4, whereby the user may direct the computer 4 to run the defragmenter 6 by inputting a single command, e.g., for example by positioning the cursor 14 over the defrag icon 2 and then clicking the mouse button 16. When the user directs the computer 4 in step 2.6 to enable display of the defrag icon 2, the computer 4 proceeds on from step 2.6 to step 2.8 and to display the defrag icon 2 within the virtual desktop image 18 (hereafter, "desktop" 18). The computer 4 proceeds onto other computational processes in step 2.10.

Figure 3:
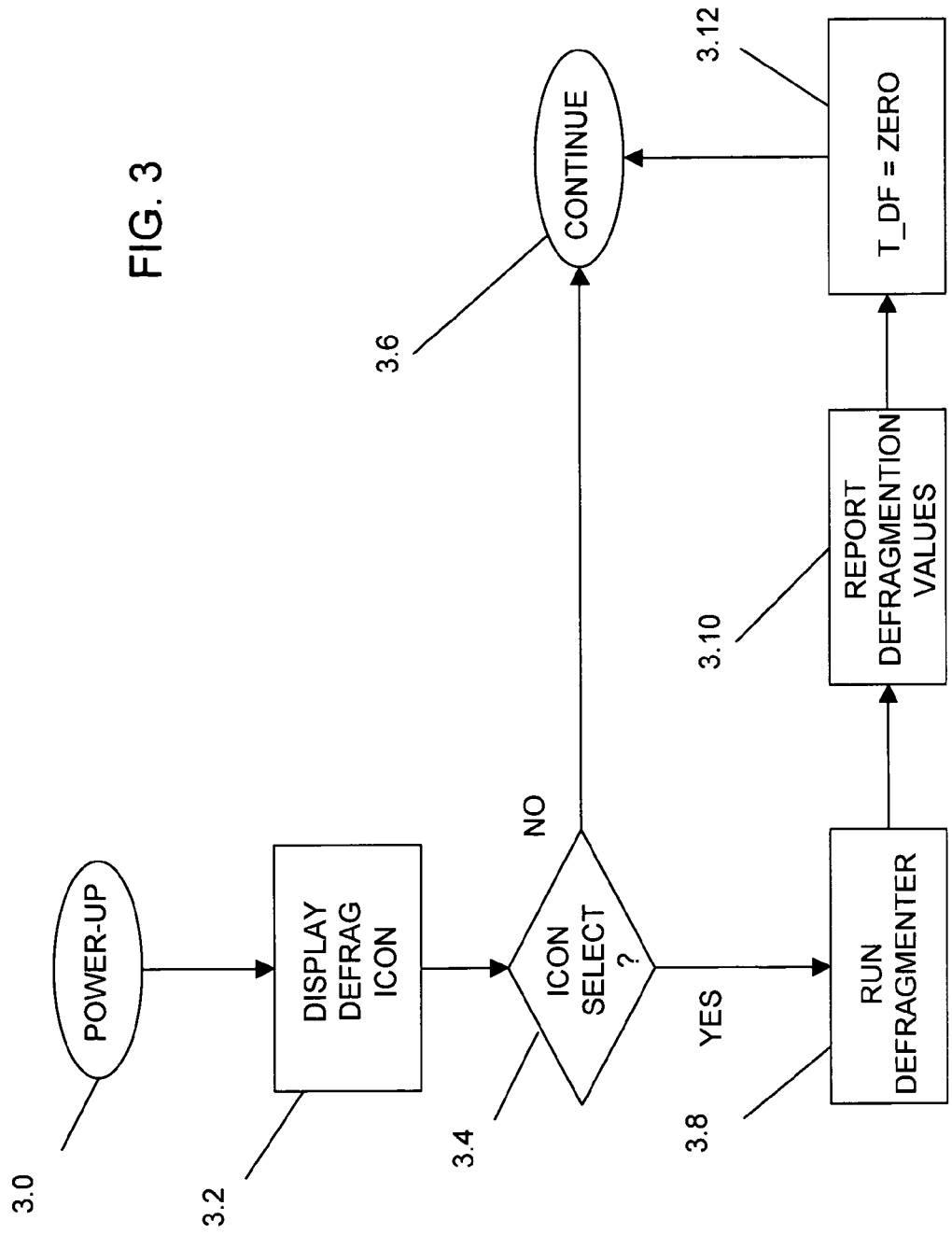
FIG. 3 is a flowchart of the computer of FIG. 11 in accordance with a first alternate preferred embodiment of the method of the present invention as performed by the computer of FIG. 11.

Referring now generally to the Figures and particularly to FIG. 3, FIG. 3 is a flowchart of the computer 4 in accordance with a first alternate preferred embodiment of the method of the present invention. In step 3.0 the user directs the computer 4 to power up wherein the computer 4 boots up and displays the desktop 18 and the defrag icon 2 in step 3.2. In step 3.4 the user may select the defrag icon 2 to initiate an execution of the defragmenter 6. When the user does not select the defrag icon 2 in step 3.4, the computer 4 proceeds from step 3.4 to step 3.6 and to perform other alternate computational operations. It is understood that the computer 4 may persistently, routinely, or occasionally maintain the defrag icon 2 within the desktop 18. It is further understood that the additional operations of step 3.6 may include a later command input by the user as per step 3.4 and to direct the computer 4 to proceed from step 3.4 to step 3.8. In step 3.8 the computer 4 runs the defragmenter 6 and reports in step 3.10 the results of the disc defragmentation of step 3.8 to the user by means of an alphanumeric character display the video screen 20. The computer 4 resets the defrag time variable T_DF to a zero value in step 3.12, and returns to other computational operations in step 3.12. It is understood that the computer 4 may return to step 3.4 by returning the computer 4 to display the desktop 18 and therein presenting the defrag icon 2 as available for selection by means of a point and click device, e.g., the mouse button 16, or transmitting a selection command from a wireless device 22 or a computer keyboard 24 of or communicatively coupled to the computer 4.

Figure 4:
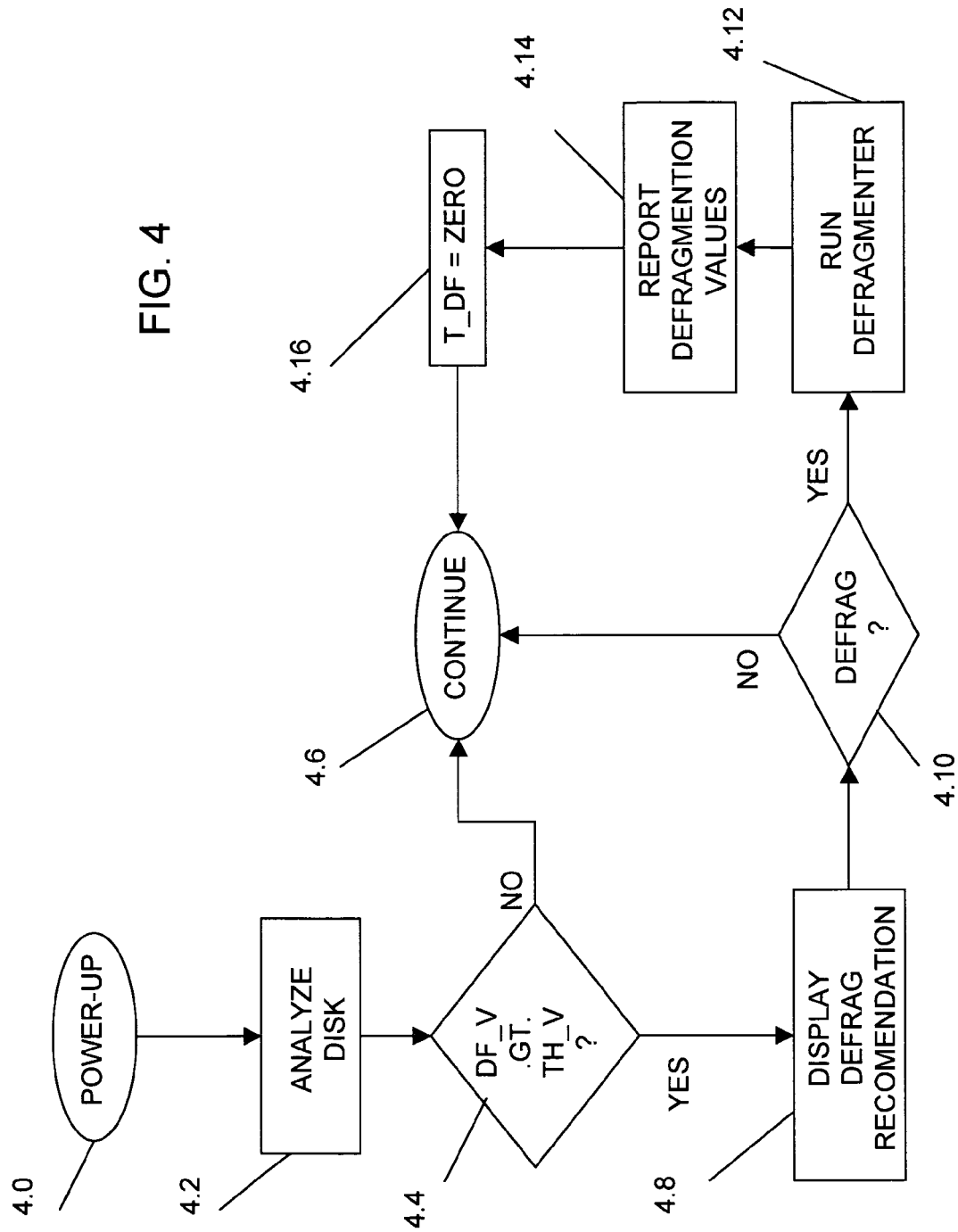
FIG. 4 is a software flowchart of a first alternate preferred embodiment of the method of the present invention as performed by the computer of FIG. 11.

Referring now generally to the Figures and particularly to FIG. 4, FIG. 4 is a software flowchart of a first alternate preferred embodiment of the method of the present invention, wherein the computer 4 analyzes the present defragmantation state of the hard disc 8 and generates a defragmentation variable DF_V in step 4.2 and then in step 4.4 compares the present value of the defragmentation variable DF_V against a defragmentation threshold value TH_V. When the computer 4 determines in step 4.4 that the defragmentation variable DF_V is not greater than the defragmentation threshold value TH_V, the computer 4 proceeds on to step 4.6 and to perform alternate computational operations. It is understood that the computer 4 may return to step 4.2 occasionally or periodically during operations after the first execution of step 4.2. When the computer 4 determines in step 4.4 that the defragmentation variable DF_V (hereafter, "defrag variable" DF_V) is greater than the defragmentation threshold value TH_V, the computer 4 proceeds from step 4.4 to step 4.8, whereupon the user is prompted by an alphanumeric message 26 presented within an indication area 28 of the desktop 18 as displayed on the video screen 20. The user may direct the computer 4 to run the defragmenter 6 by placing the cursor 14 over the indication area 28 and depressing the mouse button 16. When the user does not direct the computer 4 to run the defragmenter 6 in step 4.10, the computer proceeds on to step 4.6. When the computer 4 receives a command to run the defragmenter 6 in step 4.10, the computer proceeds on from step 4.10 to step 4.12 and to run the defragmenter 6. The computer then proceeds on from step 4.12 to step 4.14 and reports results of the defragmenter execution to the user by means of a display alphanumeric characters and/or graphics display on the video screen 20. The computer 4 resets the defrag time variable T_DF to a zero value in step 4.16, and proceeds onto step 4.6.

Figure 5:
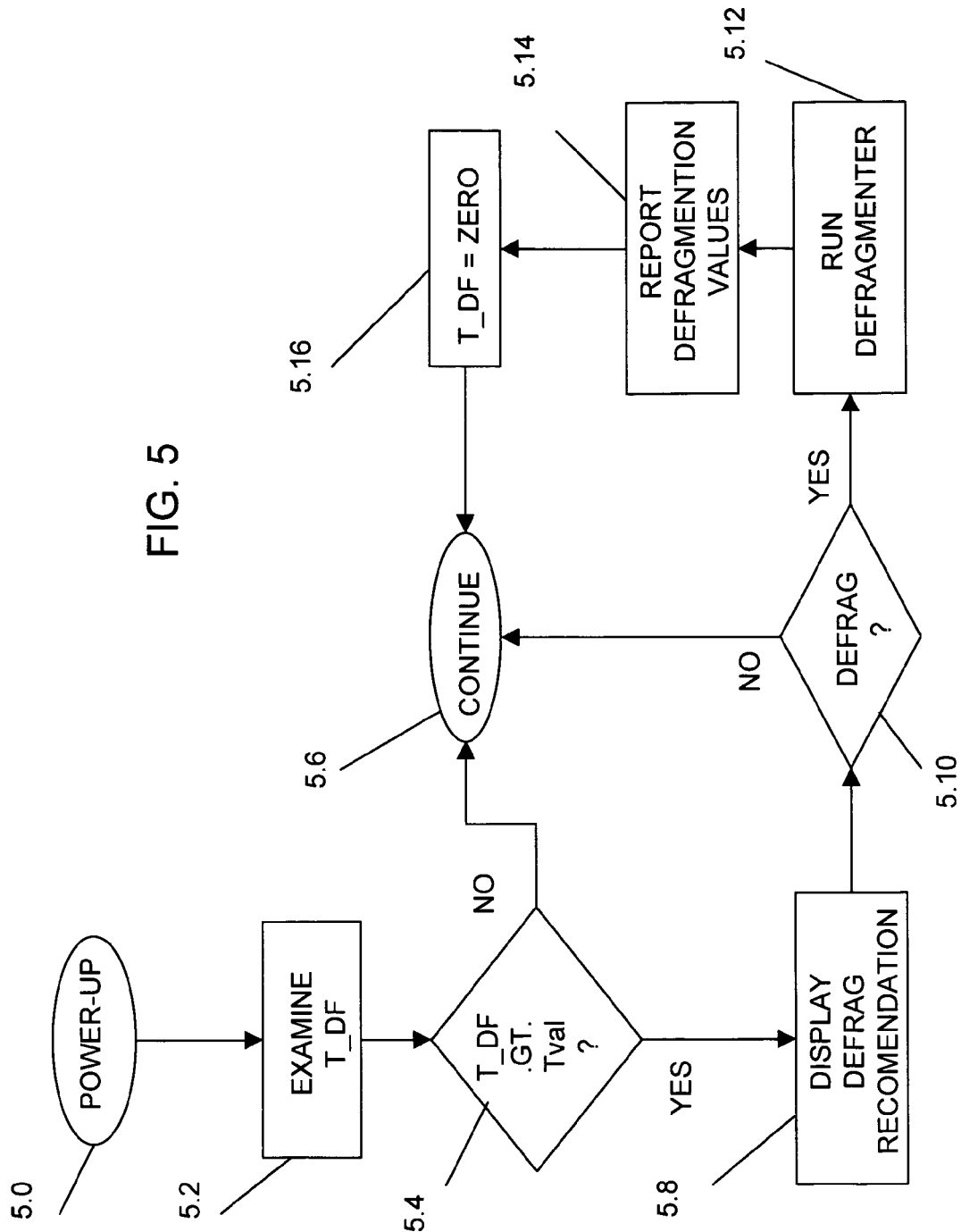
FIG. 5 is a software flowchart of a second alternate preferred embodiment of the method of the present invention as performed by the computer of FIG. 11.

Referring now generally to the Figures and particularly to FIG. 5, FIG. 5 is a software flowchart of a second alternate preferred embodiment of the method of the present invention, wherein the computer 4 evaluates the present value of the defragmentation time variable T_DF and compares the present value of the defragmentation time variable T_DF against a defragmentation threshold time value Tval in step 5.4. When the computer 4 determines in step 5.4 that the defragmentation time variable T_DF (hereafter, "defrag time variable" T_DF) is not greater than the defragmentation time threshold time value Tval, the computer 4 proceeds on to step 5.6 and to perform alternate computational operations. It is understood that the computer 4 may return to step 5.2 occasionally or periodically during operations after the first execution of step 5.2. When the computer 4 determines in step 5.4 that the defrag time variable T_DF is greater than the defrag time threshold time value Tval, the computer 4 proceeds from step 5.4 to step 5.8, whereupon the user is prompted by an alphanumeric message 26 presented within an indication area 28 of the desktop 18 as displayed on the video screen 20. The user may direct the computer 4 to run the defragmenter 6 by placing the cursor 14 over the indication area 28 and depressing the mouse button 16. When the user does not direct the computer 4 to run the defragmenter 6 in step 5.10, the computer proceeds on to step 5.6. When the computer 4 receives a command to run the defragmenter 6 in step 5.10, the computer proceeds on from step 5.10 to step 5.12 and to run the defragmenter 6. The computer 4 then proceeds on from step 5.12 to step 5.14 and reports results of the defragmenter execution to the user by means of display alphanumeric characters and/or graphics display on the video screen 20. The computer 4 resets the defrag time variable T_DF to a zero value in step 5.16, and proceeds onto step 5.6.

Figure 6:
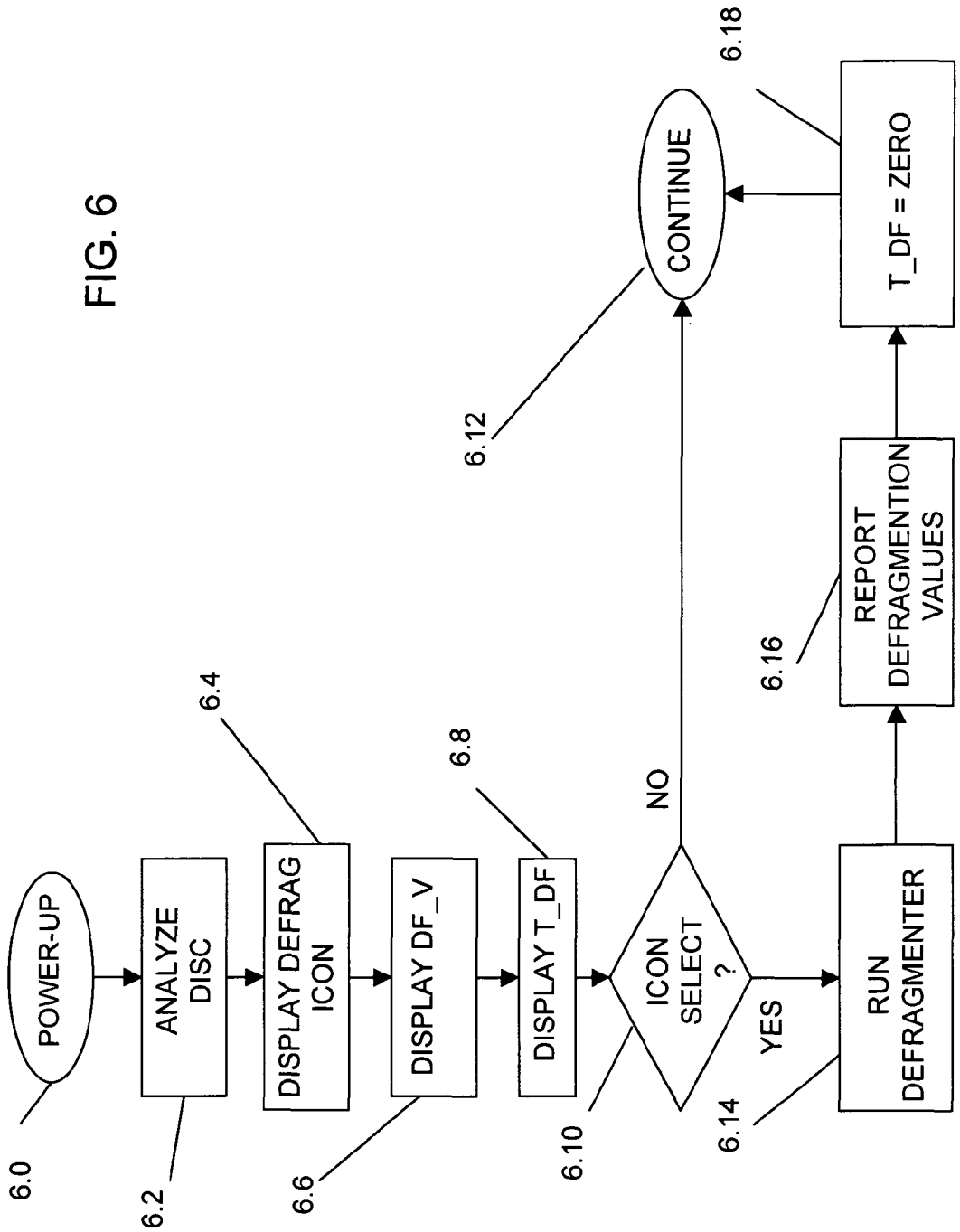
FIG. 6 is a software flowchart of a third alternate preferred embodiment of the method of the present invention as performed by the computer of FIG. 11.

Referring now generally to the Figures and particularly to FIG. 6, FIG. 6 is a software flowchart of a third alternate preferred embodiment of the method of the present invention, wherein the computer 4 analyzes the disc 8 and generates a measurement of the current value of the defrag variable DF_V. In step 6.4 the computer 4 displays the defrag icon 2. The computer 4 further displays the defrag variable DF_V in step 6.6 and the defrag time variable T_DF in step 6.8. The defrag icon 2, the defrag variable DF_V and the defrag time variable T_DF are all displayed on the video screen 20 of the computer 4 in steps 6.4, 6.6 and 6.8 respectively.

In step 6.10 the user may select the defrag icon 2 to initiate an execution of the defragmenter 6. When the user does not select the defrag icon 2 in step 6.10, the computer 4. proceeds from step 6.10 to step 6.12 and to perform other alternate computational operations. It is understood that the computer 4 may maintain the defrag icon 2 within the desktop 18 while performing additional operations of step 6.12. It is further understood that the computer 4 may return from step 6.12 and to step 6.2 and to display the desktop 18 on the video screen 20 and therein continuously or repeatedly visually present the defrag icon 2 as available for selection by means of a point and click device, e.g., the mouse button 16, or transmitting a selection command from a wireless device 22 or a computer keyboard 24 communicatively coupled to the computer 4.

In the first and additional executions of step 6.10, the computer 4 enables and can accept a command input from the user by means of a point and click device 16, 22 or 24 that directs the computer 4 to proceed from step 6.10 to step 6.14, wherein the computer 4 runs the defragmenter 6. In step 6.16 the computer 4 reports results of the disc defragmentation of step 6.14 to the user by means of an alphanumeric character display (as shown included in the defrag icon 2 of FIG. 9) on the video screen 20. The computer 4 proceeds from step 6.16 to step 6.18 and resets the defrag time variable T_DF to a zero value in step 6.18. The computer 4 may proceed from step 6.18 to perform other computational operations in step 6.12, to include returning to step 6.2.

Figure 7:
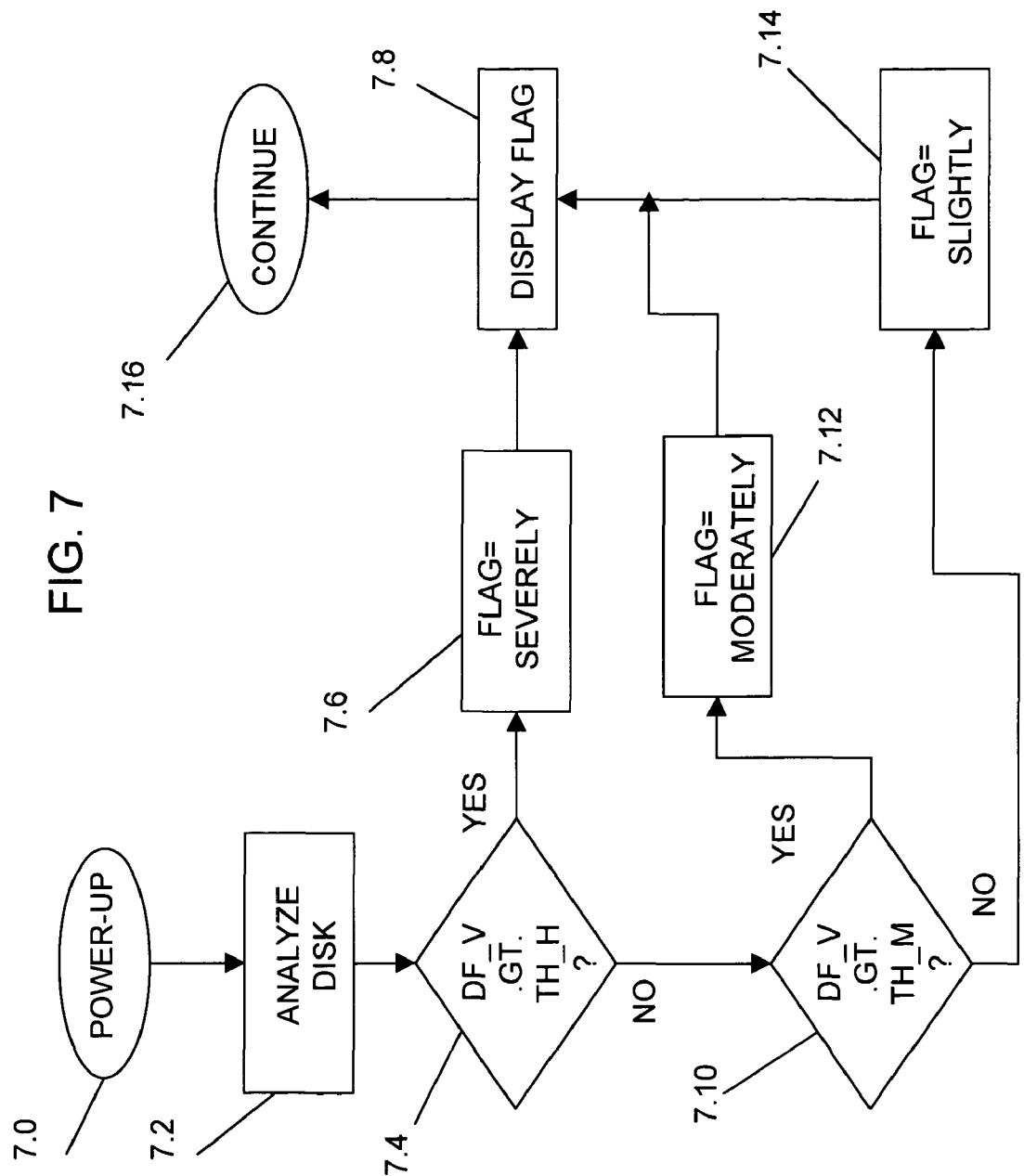
FIG. 7 is a software flowchart of a fourth alternate preferred embodiment of the method of the present invention as performed by the computer of FIG. 11.

Referring now generally to the Figures and particularly to FIG. 7, FIG. 7 is a software flowchart of a fourth alternate preferred embodiment of the method of the present invention, wherein the user is automatically provided with a categorical description of the level of defragmentation of the disc 8 indicated by the defrag variable DF_V. In step 7.2 the computer 4 analyzes the disc 8 and updates the defrag variable DF_V. In step 7.4 the computer 4 compares the defrag variable DF_V with a high defrag value TH_H, and proceeds form step 7.4 to step 7.6 when the magnitude of the defrag variable DF_V exceeds the high defrag value TH_H. It is understood that when the magnitude of the defrag variable DF_V exceeds the magnitude if the high defrag value TH_H that the efficiency of the hard disc drive 10 in responding to information read requests is significantly impaired by the degree of defragmentation of the disc 8. In step 7.6 a text string variable FLAG is set to the text value of SEVERELY, and in step 7.8 the text string variable FLAG is presented within the desktop 18 as displayed on the video screen 20.

The computer 4 proceeds form step 7.4 to step 7.10 when the magnitude of the defrag variable DF_V is determined in step 7.4 to not to exceed the high defrag value TH_H. In step 7.10 the computer 4 compares the defrag variable DF_V with a medium defrag value TH_M, and proceeds form step 7.10 to step 7.12 when the magnitude of the defrag variable DF_V exceeds the medium defrag value TH_M. It is understood that when the magnitude of the defrag variable DF_V exceeds the magnitude of the medium defrag value TH_M that the efficiency of the hard disc drive 10 in responding to information read requests is moderately impaired by the degree of defragmentation of the disc 8. In step 7.12 a text string variable FLAG is set to the text value of moderately. The computer 4 proceeds from step 7.12 and to step 7.8 wherein the text string variable FLAG is presented within the desktop 18 as displayed on the video screen 20.

The computer proceeds from step 7.8 to step 7.16 to perform additional computational operations, which may include additional executions of steps 3.2, 4.2, 5.2, 6.2 and/or 7.2.

Figure 8:
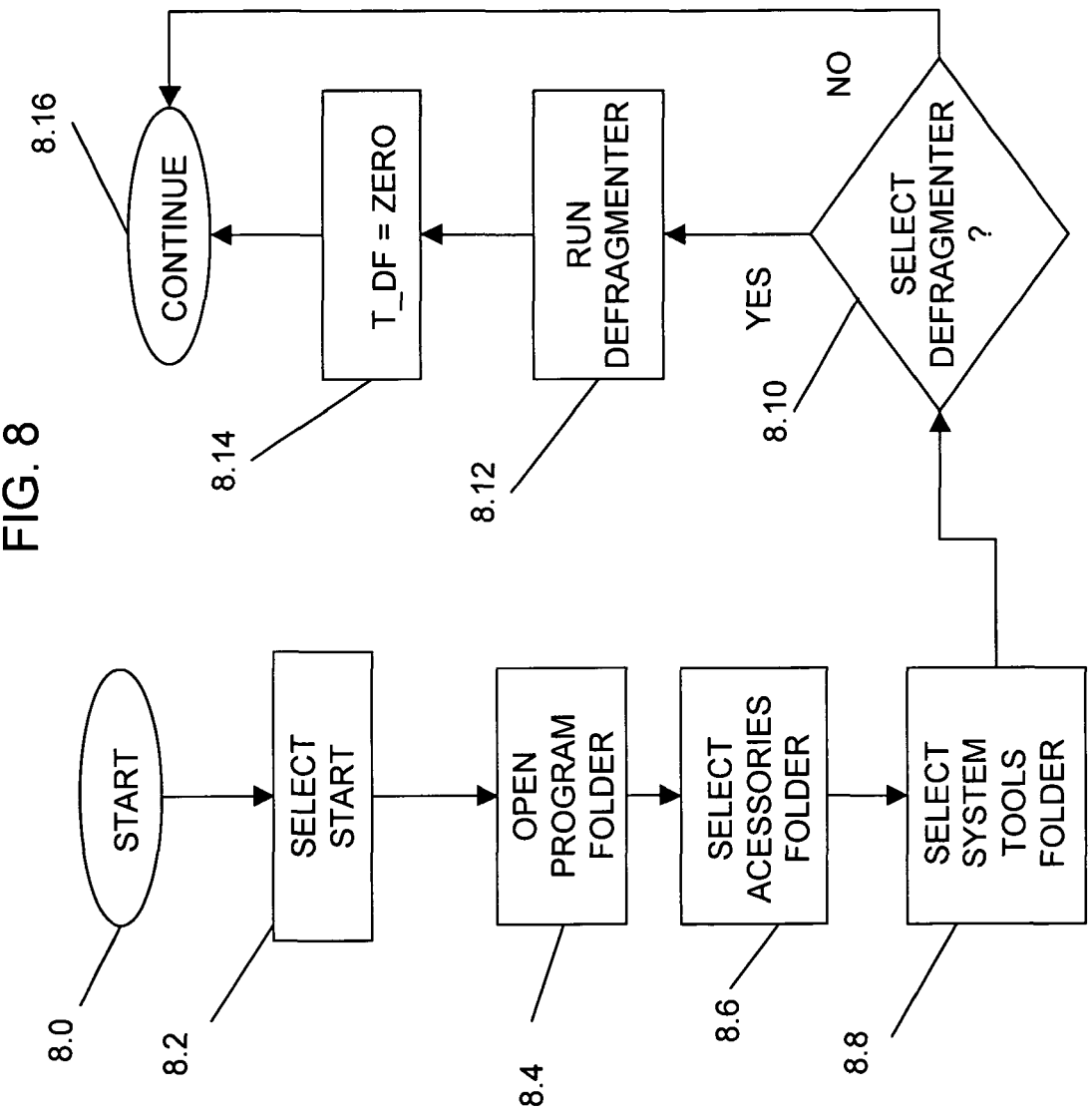
FIG. 8 is a software flowchart of a fifth alternate preferred embodiment of the method of the present invention as performed by the computer of FIG. 11.

Referring now generally to the Figures and particularly to FIG. 8, FIG. 8 is a software flowchart of a fifth alternate preferred embodiment of the method of the present invention, wherein is step 8.2 the user selects a START button from the desktop 18 and the computer 4 responds by opening up and displaying a start menu within the desktop 18 in response. In step 8.4 the user selects a PROGRAM folder from the start menu as displayed within the desktop 18 and the computer 4 displays a program folder menu within the desktop in response. In step 8.6 the user selects an ACCESSORIES folder from the desktop 18 and the computer 4 displays an accessories folder menu within the desktop in response. In step 8.8 the user selects a SYSTEMS TOOLS folder from the accessories folder menu as displayed within the desktop 18 and the computer 4 displays a DEFRAGMENTER execution icon in response. In step 8.10 the computer 8 determines if the user has issued a command to run the defragmenter 6 by using a point and click device 16, 22 or 24 to position the cursor 14 over the defragmenter execution icon 2 and the issuing a selection command from the point and click device 16, 22 or 24. When the computer 4 determines in step 8.10 that the user has input a command to run the defragmenter 6, the computer 4 proceeds from step 8.10 to run the defragmenter 6 in step 8.12 and to reset the defrag time variable T_DF to a zero value in step 8.14. The computer 4 proceeds from step 8.14 to step 8.16 and to perform additional computational processes, which may include a first or additional execution of steps 3.2, 4.2, 5.2, 6.2, 7.2, and/or 8.2.

Figure 9:
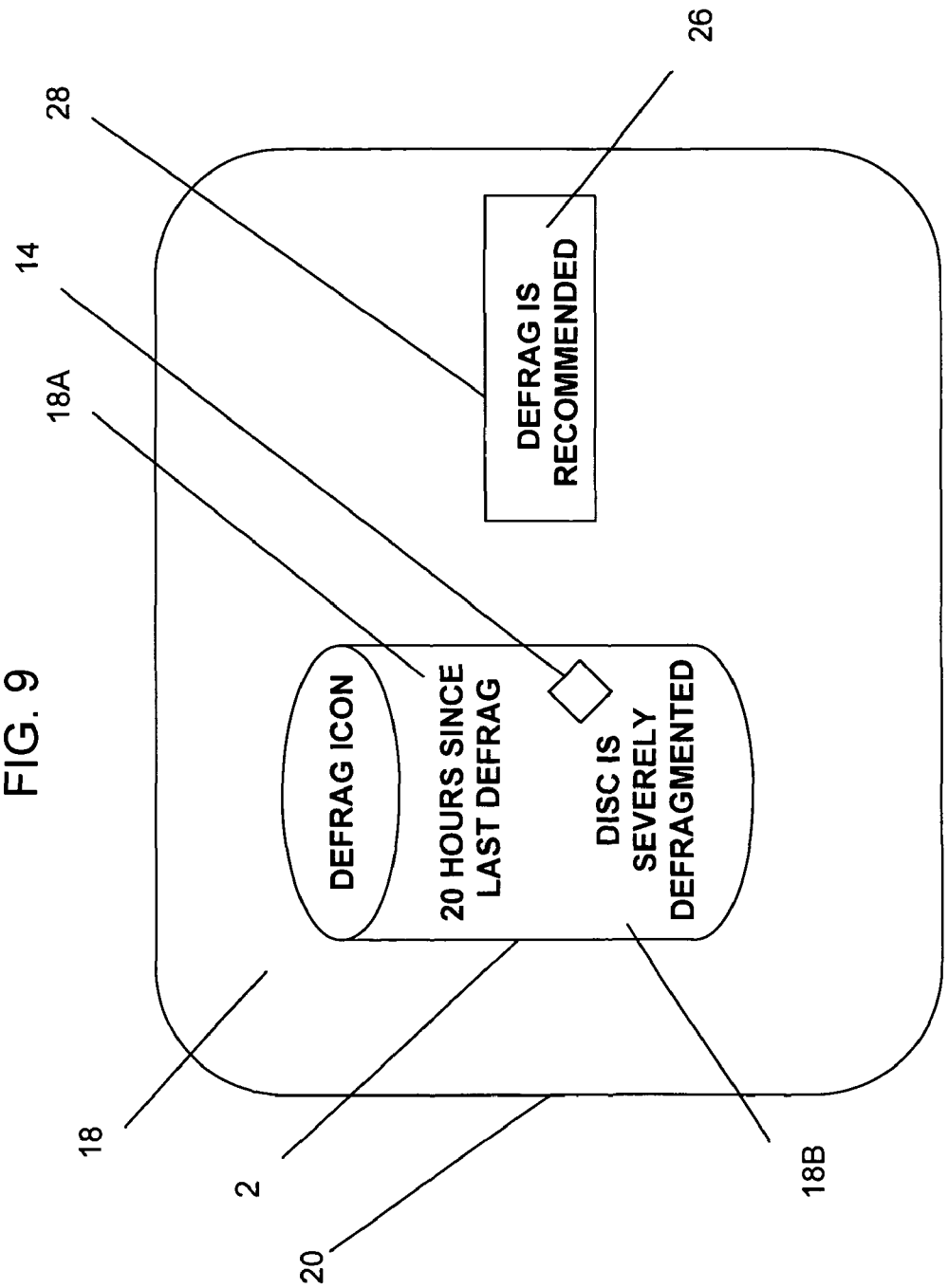
FIG. 9 is an illustration of a video screen of the computer displaying a virtual desktop image that includes a defrag icon.

Referring now generally to the Figures and particularly to FIG. 9, FIG. 9 is an illustration of the video screen 20 of the computer 4 displaying the desktop 18. The desktop 18 includes the defrag icon 2 with a first reporting text 18A that describes the state of defragmentation of the disc 8 as per FIGS. 4, 6 and 7. The defrag icon 2 may additionally or alternatively include a second reporting text 18B that states or approximates the value of the defrag time variable T_DF as per FIGS. 2 through 6 and 8.

Figure 10:
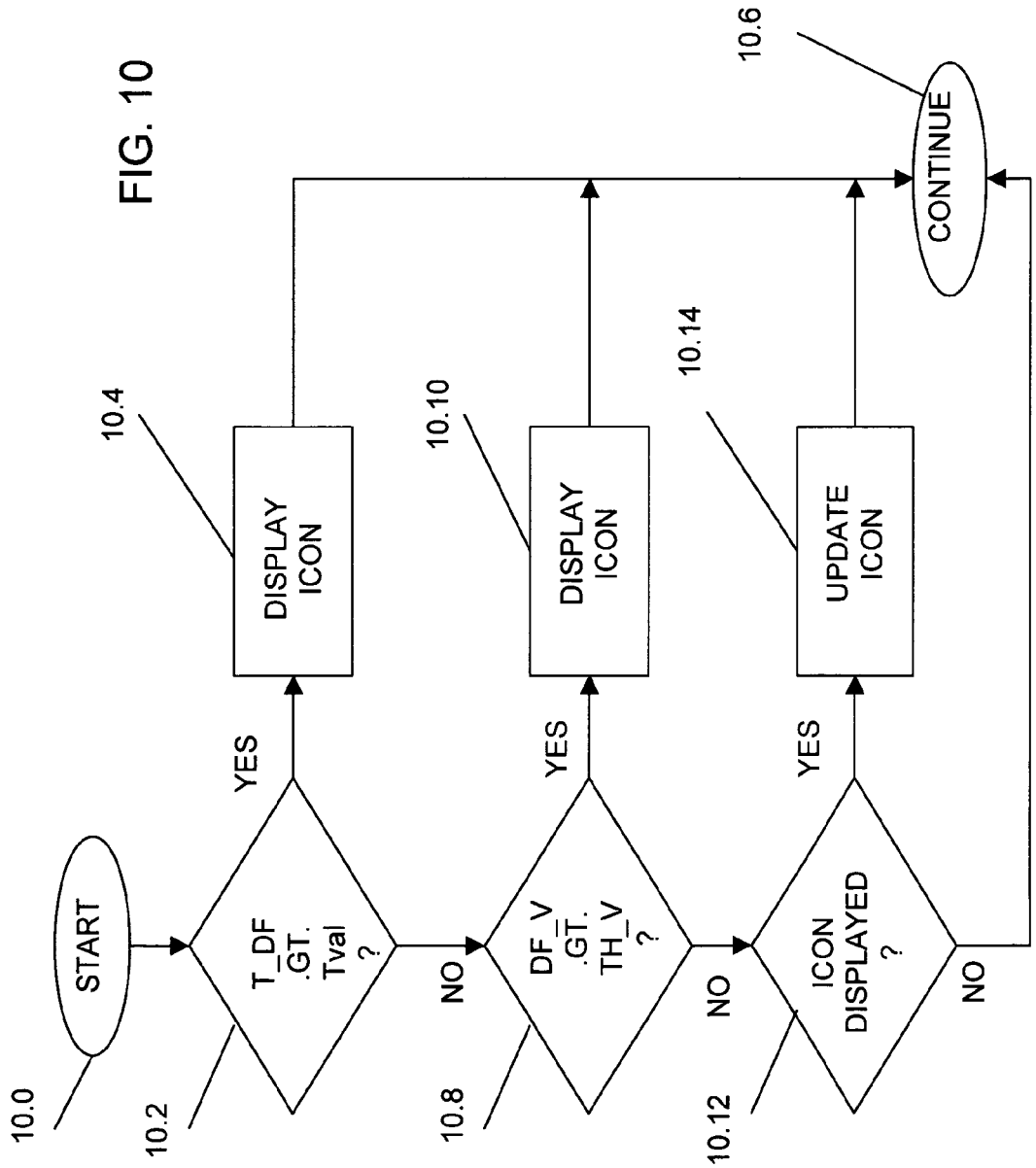
FIG. 10 is a software flowchart of a sixth alternate preferred embodiment of the method of the present invention.

Referring now generally to the Figures and particularly to FIG. 10, FIG. 10 is a software flowchart of a sixth alternate preferred embodiment of the method of the present invention, wherein the defrag icon 2 is displayed within the desktop 18 when the time defrag variable T_GF is greater than the defrag time value T_TH and/or the defrag variable DF_V is greater than a specific magnitude, e.g., the high defrag value TH_H. From, step 10.2 when the computer 4 determines that the time defrag variable T_DF is greater than the defrag time value T_TH, the computer 4 proceeds to display the defrag icon 2 within the desktop 18 in step 10.4 and then moves on to other computational operations in step 10.6. When the determines in step 10.2 that the time defrag variable DF_V is not greater than the defrag time value T_TH, the computer 4 proceeds onto step 10.8 to determine whether the defrag variable DF_V is greater than the high defrag value TH_V. When the computer 4 determines in step 10.8 that the defrag variable DF_V is greater than the high defrag value TH_V, the computer 4 proceeds onto display the defrag icon 2 within the desktop 18 in step 10.10 and then moves on to other computational operations in step 10.6. When the computer 4 determines in step 10.8 that the defrag variable DF_V is not greater than the high defrag value TH_V, the computer 4 proceeds onto step 10.12 and to determine whether the defrag icon 2 is currently being displayed within the desktop 18, and if the defrag icon is being displayed within the desktop 18 at that time, to cease the current display of the defrag icon 2. By this method the defrag icon is typically only displayed when the computer 4 determines to recommend to the user that the defragmenter 8 be run. The computer 4 proceeds from either step 10.12 or step 10.14 to perform other computational operations in step 10.6.

Figure 11:
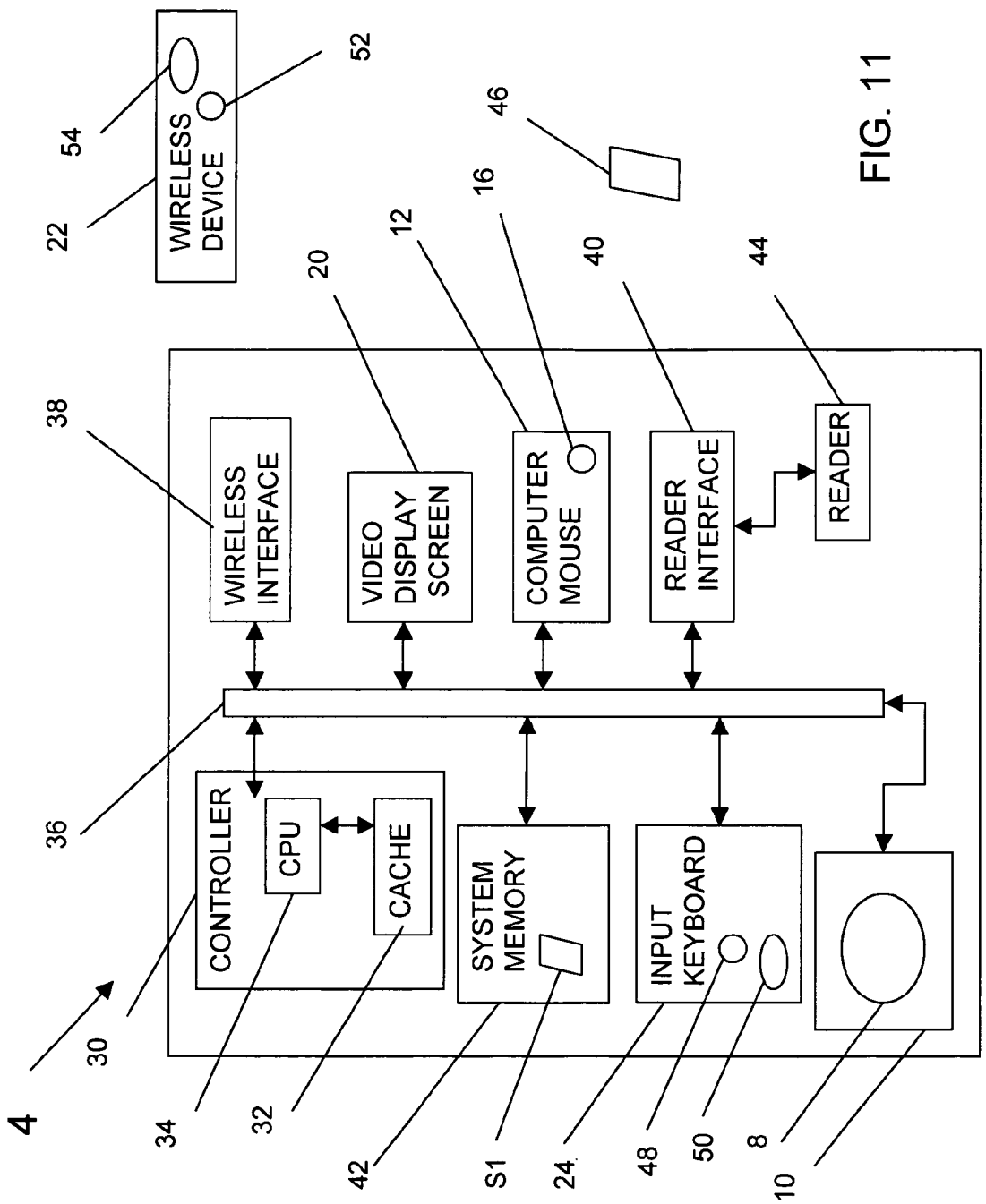
FIG. 11 is a schematic diagram of the computer system configured to execute or instantiate one or more aspects of the method of the present invention as disclosed in FIGS. 1 through 10 and FIG. 12.

Referring now generally to the Figures and particularly to FIG. 11, FIG. 11 is a schematic diagram of the computer 4. It is understood that the computer 4 may be or comprise a personal computer, a wireless telephone, a computer game console, a digital television, or a personal digital assistant.

A controller 30 comprising a cache memory 32 and a central processing unit 34 is communicatively coupled with an internal communications bus 36. In addition, a wireless interface 38, the video display screen 20, the computer mouse 12, a digital media reader interface 40, the disc drive 10, the computer keyboard 24, and a system memory 42 are bi-directionally coupled with controller 30 via the internal communications bus 36. The media reader interface 40 is in turn bi-directionally coupled with a digital media reader 44. The digital media reader 44 and a machine-readable digital medium 46 are selected and configured to enable the reader 44 to provide software encoded machine-executable instructions and information that direct the computer 4 to perform in accordance with one or more aspects of the method of the present invention as disclosed herein. The digital media reader 44 and a machine-readable digital media 46 may optionally be selected and configured to enable the reader 44 to write machine-readable instructions and information for storage onto the digital medium 46.

The terms "computer-readable medium" 46 and "computer-readable media" 46 as used herein refer to any suitable medium known in the art that participates in providing instructions to the network and/or the computer. Such a medium 46 may take many forms, including but not limited to, non-volatile media, volatile media, and transmission media. Non-volatile media includes, for example, optical or magnetic disks, such as may be comprised within the system memory.

Volatile media includes dynamic memory. Transmission media includes coaxial cables, copper wire and fiber optics. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which the computer 4 can read.

Various forms of computer-readable media 46 may be involved in carrying one or more sequences of one or more instructions to the network for execution. For example, the instructions may initially be carried on a magnetic disk of a remote server. The remote server can load the instructions into its dynamic memory and send the instructions over a telephone line using a modem.

A system software S1 is stored within the system memory 42 and/or elsewhere within the computer 4, e.g., in the cache memory 32 or in the digital media 46 when in communication with the digital media reader 44. A key 48 and a trackball 50 of the keyboard 24 enable the user to position the cursor 14 over the defrag icon 2 and to select the defrag icon 2, whereby the computer 4 is directed by the user to run the defragmenter 6 by issuing a single command. A device button 52 and a wireless trackball 54 of the wireless device 22 enable the user to manipulate and position the cursor 14 over the defrag icon 2 and to select the defrag icon 2, whereby the computer 4 is directed by the user to run the defragmenter 6 by issuing a single command. The mouse button 16 and a mouse trackball 56 of the computer mouse 12 enable the user to manipulate and position the cursor 14 over the defrag icon 2 and to select the defrag icon 2, whereby the computer 4 is directed by the user to run the defragmenter 6 by issuing a single command.

In particular, the computer 4 may be a computer system, such as (a.) a VAIO FS8900™ notebook computer marketed by Sony Corporation of America, of New York City, N.Y., (b.) a SUN SPARCSERVER computer workstation marketed by Sun Microsystems of Santa Clara, Calif. running LINUX or UNIX operating system; (c.) a personal computer configured for running WINDOWS XP™ operating system marketed by Microsoft Corporation of Redmond, Wash.; (d.) a PowerBook G4™ personal computer as marketed by Apple Computer of Cupertino, Calif.; or (e.) a iPhone™ cellular telephone as marketed by Apple Computer of Cupertino, Calif.

Figure 12:
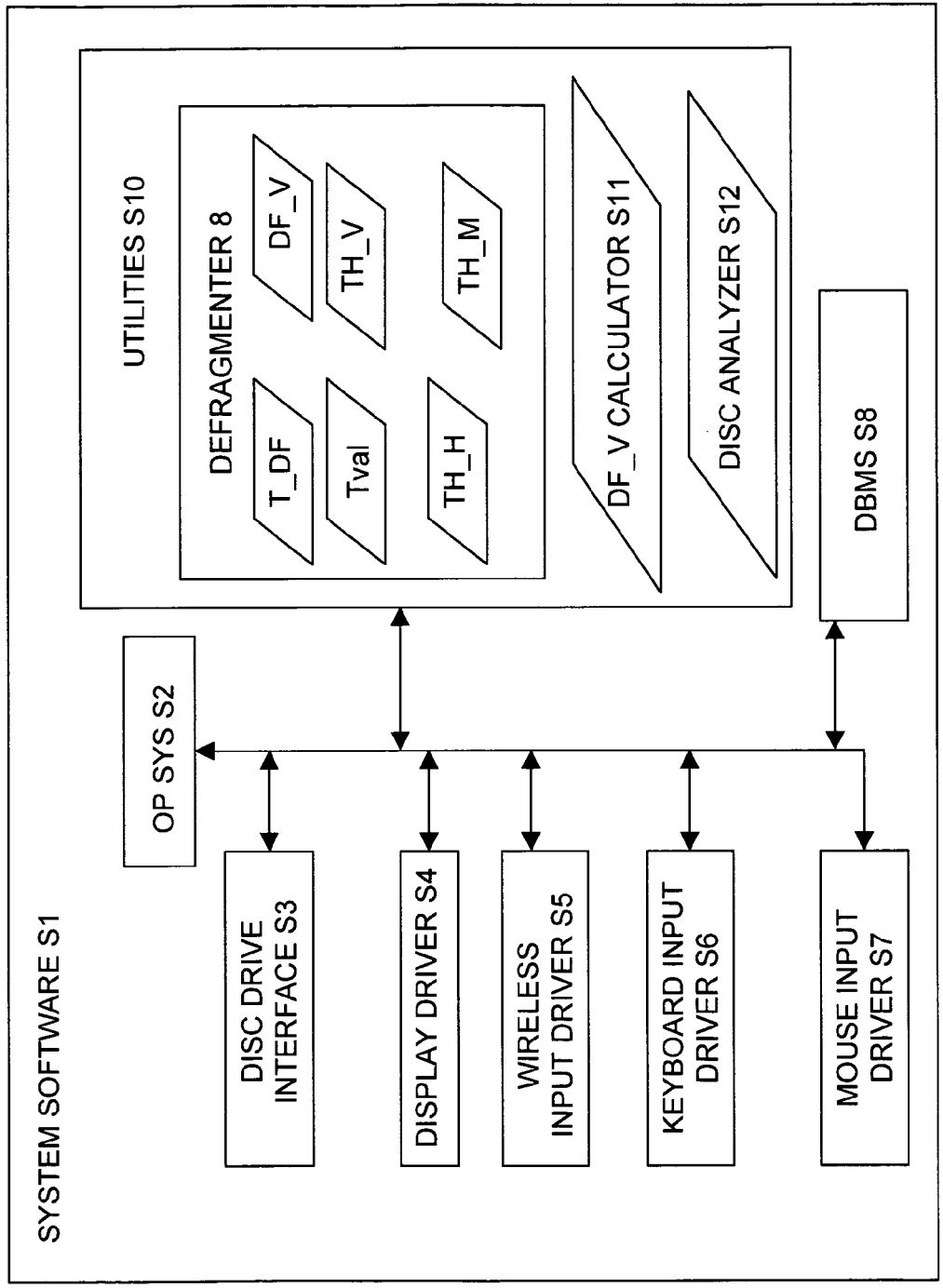
FIG. 12 is a schematic diagram of a system software of the computer of FIG. 11.

Referring now generally to the Figures and particularly to FIG. 12, FIG. 12 is a schematic diagram of the system software S1 of the computer 4. The system software S1 includes a plurality of software programs and modules, to include an operating system S2, a disc drive interface S4, a video display driver S4, a wireless input driver S5, a keyboard input driver S6, a mouse input driver S7, a database management system S8, an a set of utility programs S10. The set of utility programs S10 includes the defragmenter 8, a defrag value calculator S11 and a disc analyzer S12. The operating system S2 may be (1.) a WINDOWS XP™ operating system marketed by Microsoft Corporation of Redmond, Wash., (2.) a LINUX™ or UNIX™ operating system, and/or (3.) other suitable computer operating system. The disc analyzer S12 enables the CPU to interrogate the disc drive 10 and to determine a measure of defragmentation of the disc 8. The defrag value calculator S11 accepts the measure of defragmentation generated by the disc analyzer S12 and derives therefrom the current defrag value DF_V.

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible embodiments of the Present Invention. The examples given should only be interpreted as illustrations of some of the preferred embodiments of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the Present Invention as disclosed and claimed should, therefore, be determined with reference to the knowledge of one skilled in the art and in light of the disclosures presented above.

What is claimed is:

1. A method of defragmenting a disc memory of a computer, the method comprising:
    persistently presenting an icon identifying a defragmentation process upon detection by the computer of a pre-established degree of fragmentation of a memory of the computer and until a following defragmentation process is initiated by the user, wherein the presentation of the icon is comprised within a desktop startup visual display of the computer; and
    in response to only a single signal input by a user, directing the computer to execute the defragmentation process.

2. The method of claim 1, wherein the icon is persistently presented after a preset time period after an execution of a previous defragmentation process.

3. The method of claim 2, wherein the computer ceases rendering the icon after the initiation of a second defragmentation process and reinitiates persistently rendering the icon after a preset time period after the execution of the second defragmentation process.

4. The method of claim 1, wherein the single action comprises clicking a button.

5. The method of claim 4, wherein the computer comprises a mouse peripheral having a selection button and the single action comprises clicking the selection button of the mouse peripheral.

6. The method of claim 5, wherein the single action is clicking the selection button of the mouse peripheral when a cursor is positioned over a predefined area of the displayed information.

7. The method of claim 1, wherein the user may direct the computer to display the defragmentation process icon by selecting a start menu.

8. The method of claim 7, wherein the selection of the start menu directing the computer to display the defragmentation process icon is affected by clicking a button of a point and click device.

9. The method of claim 8, wherein the computer comprises a mouse peripheral and the selection of the start menu directing the computer to display the defragmentation process icon is affected by clicking a selection button of the mouse peripheral.

10. The method of claim 1, wherein the computer is selected from the group consisting of a personal computer, a wireless telephone, a computer game console, a digital television, and a personal digital assistant.

11. The method of claim 1, wherein the single action is selection using a television remote control.

12. The method of claim 1, wherein the single action is depressing of a key on a key pad of the computer.

13. The method of claim 1, wherein the single action is selecting using a pointing device.

14. The method of claim 1, wherein the single action is selection of a visually displayed indication.

15. A system for defragmenting a disc memory of a computer, the system comprising:
   means to persistently visually present an icon identifying a defragmentation process within a desktop display of the computer upon detection by the computer of a pre-established degree of fragmentation of a memory of the computer and until a following defragmentation process is initiated by the user; and means to direct the computer to execute the defragmentation process in response to a user selection of the icon.

16. The system of claim 15, wherein the computer is selected from the group consisting of a personal computer, a wireless telephone, a computer game console, a digital television, and a personal digital assistant.

17. The system of claim 15, wherein the computer comprises a mouse and the single action comprises clicking a button of the mouse.

18. The system of claim 17, wherein the single action comprises clicking the mouse button of the computer when a cursor is positioned over a predefined area of a displayed information.

19. A non-transitory computer-readable media comprising software-encoded instructions that direct an information technology system to:
   (a.) persistently visually present an icon identifying a defragmentation process upon detection by the computer of a pre-established degree of fragmentation of a memory of the computer, wherein the icon is comprised within a desktop startup visual display of the computer; and
   (b.) in response to a user selecting the icon, directing the computer to execute the defragmentation process.

* * * * *